United States Patent Office   3,444,155
Patented May 13, 1969

3,444,155
PROCESS FOR PREPARING DEGRADED POLYETHYLENE
John J. Fish, New York, N.Y., assignor to The Western Petrochemical Corporation, Chanute, Kans., a corporation of Delaware
No Drawing. Filed Apr. 15, 1966, Ser. No. 542,754
Int. Cl. C08f 27/28, 27/22
U.S. Cl. 260—94.9                                7 Claims

ABSTRACT OF THE DISCLOSURE

A novel process for reforming polyethylene comprises heating polyethylene in the presence of a peroxygen compound to a temperature of at least 760° F. in not more than about six minutes. The reformed polyethylene is useful alone or mixed with a hydrocarbon solvent and/or paraffin wax for cleaning and polishing.

---

This invention relates to novel products of polyethylene and to novel methods for making them. More particularly, this invention relates to low molecular reformed polyethylenes made from high molecular polyethylenes and having outstanding properties and especially excellent adhesion to other materials and to novel methods for producing such reformed polyethylenes.

Heretofore, high molecular polyethylenes have been degraded thermally or in the presence of catalysts or degradation initiators to produce low molecular degraded polyethylenes. Such degraded polyethylenes still retain the elastomeric or plastic properties of the high molecular polyethylene and possess viscosities at the level of 600 cps. at 250° C. When dissolved in naphtha the degraded polyethylenes form good pastes. However, such pastes exhibit poor adhesion and rub off surfaces to which they are applied, failing to produce a gloss upon buffing.

It is an object of this invention to produce reformed polyethylene in which a wax-like crystal form and fracture predominate and in which plastic-like characteristics are subordinated.

Another object is the provision of a reformed polyethylene and process for making same wherein said reformed polyethylene has a low viscosity, low molecular weight and relatively high melting point.

Another object is the provision of reformed polyethylene which is characterized by excellent adhesion and can be buffed to a very high gloss which is durable to repeated washings with detergents.

Another object is the provision of reformed polyethylene which is capable alone or in admixture with other materials, such as hydrocarbon solvents and paraffin wax, of cleaning and polishing at the same time.

Another object is the provision of reformed polyethylene which is highly reactive to further processing such as subsequent oxidation and polymerization.

Other objects and advantages are apparent from the following detailed description.

This invention is based on the unexpected discovery that relatively high molecular weight polyethylenes can be reformed at high temperatures in the presence of hydrogen peroxide to produce a low molecular weight reformed polyethylene having unexpected properties. The reformed polyethylene produced by this invention possesses high melting points, e.g., of the order of 220 to 275° F. Such reformed polyethylene is characterized by very low viscosities, e.g., in the range of 20 to 150 cps. at 300° F., a wax-like crystalline consistency, and a conchodial fracture similar to that of a synthetic wax. The reformed polyethylene of this invention differs from the heretofore known degraded polyethylenes in which, in general, plastic-like properties, high viscosities and low softening points predominate.

The novel reformed polyethylene of this invention is produced by rapidly heating polyethylene in the presence of a peroygen compound to a temperature of at least about 760° F. in not more than about six minutes, preferably, in 30 to 60 seconds.

It has been found that any relatively high molecular weight polyethylene can be employed in the novel process. For example, linear, high density or low density polyethylene can be employed. Illustratively, polyethylenes having a molecular weight of 30,000 to 300,000 can be used as starting materials in the process of this invention.

The preferred peroxygen compound used in the process is hydrogen peroxide, however, other peroxygen compounds, including the inorganic compounds, such as sodium percarbonate, zinc peroxide, basic peroxide hydrates or perhydrates of salts obtained from the acids of boron, or cadmium peroxide or sodium persulfate, can be used. In addition, the organic peroxy compounds, such as the well known peroxide catalysts, including cumene hydroperoxide, dietertiarybutyl peroxide, benzoyl peroxide and other peroxy catalysts, such as those commonly employed in the polymerization arts, can be used. The amount of peroxy compound employed is not narrowly critical and can be varied from about 0.35% based on the weight of polyethylene. It has been found that amounts of peroxy compound above about 3% based on the weight of polyethylene provide no commensurate advantage although such larger amounts have not been found to provide disadvantageous results and may be employed if desired. The peroxy compound preferably is employed as a 35 weight percent or more solution in a suitable solvent, e.g., water for hydrogen peroxide and the other inorganic peroxy compounds or a suitable organic solvent for the organic peroxy compounds. The above-mentioned percentages are based on 100% active peroxy compound.

It is preferred to intimately admix the polyethylene with the peroxy compound prior to initiation of heating. This can be done by employing polyethylene in as small a particle size as possible, for example, by employing polyethylene in a flake or powder form. If, however, an extruder or other equipment wherein polyethylene is to be continuously fed is employed, it may be advantageous to employ granular or pellet-size polyethylene in order to facilitate the feeding. Of course, mixtures of relatively large pellets with powder or fluffy polyethylene can be employed. When pellets or granular polyethylene are employed, the amount of surface thereof contacted by the peroxy compound is relatively small as compared with the amount of surface of powdered or flaked polyethylene contacted. Thus, when pellets or relatively large particles of polyethylene are employed, it may be necessary to repeat the process two or more times.

The novel process for producing the novel reformed polyethylene product of this invention comprises the rapid heating of relatively high molecular weight pellets, chips, flakes or powder from room temperature to a temperature in excess of about 760° F. and preferably about 780 to about 800° F. in the presence of a peroxy compound mixed thoroughly with the polyethylene prior to heating. The convenient and preferred form of peroxy compound is an approximate 35 weight percent aqueous solution of hydrogen peroxide. The reaction is followed by the determination of viscosity employing a Brookfield Viscosimeter, for example, at 300° F. Variation of the reaction temperature between the minimum of about 760° F. and higher temperatures, for example, 800° F., appears to have little effect on the final viscosity obtained. It is essential to reach the above-mentioned reaction temperature in a short time, for example, less than six minutes. The reaction efficiency as measured by the achieved viscosity appears to be proportional to the amount of peroxy compound used as catalyst, higher amounts of peroxy compound produce a faster reaction and increase reaction efficiency.

Heating relatively high molecular weight polyethylene and a peroxy compound at temperatures below about 760° F. for relatively short periods produces a product of yellow color having strands of crosslinked yellow insoluble polymeric material. This discoloration and the appearance of the above-mentioned strands occur regularly when the relatively high molecular weight polyethylene and peroxy compound are slowly heated, i.e., over periods in excess of six minutes to the reaction temperature of about 760° F. Any preparatory heating period of five to six minutes or more before reaching the above-mentioned minimum reaction temperature induces cross-linkages.

When mechanical problems of feeding powdery or highly fluffy relatively high molecular weight polyethylene occur, it may be necessary to either employ relatively large, smooth pellets or mixtures of such pellets with the powdery or fluffy material. Since the pellets have a relatively smooth surface, it will be wetted only by a limited amount of peroxy compound. As a consequence, a complete reaction will not result. For example, a reformed polyethylene having a viscosity of 300 to 500 cps. at 300° F. may result. Such reformed polyethylene then is converted to either the granular, pellet or flaked form and mixed with additional peroxide and rapidly heated to further reform the polyethylene and reduce its viscosity. If it is desired to even further reduce the viscosity, the reformed polyethylene can be converted to granular, pellet or flake form and mixed with additional peroxy compound and thereafter rapidly heated for further reformation.

In order to illustrate, pellets having a smooth surface were wetted with a 35 weight percent aqueous solution of hydrogen peroxide. The surface of such pellets was found to be wetted with only a limited amount of the hydrogen peroxide solution, namely 1% based on the weight of the pellets. The thus wetted pellets were rapidly heated to 790° F. and there resulted a reformed polyethylene having a viscosity of 300 to 500 cps. at 300° F. This reformed polyethylene was then converted to granular form and mixed with additional hydrogen peroxide solution in an amount of 3% of the solution based on the weight of the granules. The resulting mixture was then heated rapidly to 790° F., yielding a reformed polyethylene having a viscosity of 30 to 70 cps. at 300° F.

If desired, powdered relatively high molecular weight polyethylene can be mixed with the pellets in order to increase the holding capacity for the peroxy compound. The powder employed can be obtained by comminuting reformed polyethylene which provides the unexpected advantage of having far superior wetting properties as compared to powdered relatively high molecular weight polyethylene.

The process of this invention is readily carried out by using conventional equipment. For example, a mechanical mixer can be employed for intimately mixing the relatively high molecular weight polyethylene with the peroxy compound. The mixture can then be fed to an electrically heated extruder having a ratio of 1 to 20, a variable speed control and a temperature capacity of 1000° F. on the surface of the barrel.

The novel reformed polyethylene products resulting from this invention are wax-like in their crystal form and fracture whereas heretofore known products of degradation of relatively high molecular weight polyethylene have the characteristics of plastics, such as elasticity and stringiness, in the melted material. The reformed polyethylene products of this invention have high melting points. The reformed polyethylene products of this invention, for example, have melting points of 220 to 275° F., penetration at 77° F./100 g./5 sec. of 0 to 5 and a viscosity of 20 to 150 cps. at 300° F. Because of its extremely low viscosity, the reformed polyethylene of this invention can be filtered to remove impurities or, if desired, a filter aid such as Microcel can be added to the molten form polyethylene or to a solution of the molten polyethylene to absorb out impurities.

The reformed polyethylene of the present invention can be dissolved in a hot solvent, such as hot mineral spirits, and cooled to form a soft paste. Quite surprisingly, the reformed polyethylene holds the solvent very tightly such that the solvent cannot be separated from the reformed polyethylene as by squeezing. The paste then can be applied and spread on a suitable surface and can be buffed to provide a lasting, smearproof, high gloss. A similar paste made from heretofore known degraded or low molecur weight polyethylenes, when applied to a suitable surface, cannot be buffed, will rub off the surface and fails to produce a gloss.

The reformed polyethylene of this invention can be blended with other wax materials, such as refined paraffin wax, for example, in amounts of 5 weight parts of reformed polyethylene and 15 weight parts of any fully refined paraffin wax. The blend can be dissolved in hot mineral spirits, for example, 80 weight parts, to form, on cooling, a firm, crystalline paste. This paste spreads easily on any solid surface, whether dry, wet or dirty and replaces the moisture and/or dirt when present. The replaced moisture and/or dirt attach themselves to the applicator or cloth. The coated surface can then be slightly buffed to produce a very high gloss without smudge marks. The resulting film is resistant to water and to repeated washings with detergents. The adherence of the film to the surface improves on exposure to air, apparently due to increasing bonding to the surface. This increased adherence or bonding effect is quite unexpected and is obtained even when the reformed polyethylene of this invention is mixed with much larger amounts of ordinary waxes such as paraffin wax.

Paste polishes made with the reformed polyethylene of this invention also will easily clean glass whereas heretofore known commercial products produce a cloudy film on the glass requiring cleaning or removal.

The novel reformed polyethylene of this invention can be employed in floor or automobile waxes, paper coatings, carbon paper inks, Thermofax coating inks, and can be incorporated in paper pulp for providing glossy effects on the paper produced therefrom.

The following examples are presented.

EXAMPLE 1

A powdered polyethylene (100 pounds), VYNH made and sold by Union Carbide Corporation, having a molecular weight of 30,000 to 60,000 and a melt index of 1.8 to 2.4 was wetted with 3 pounds of a 35 weight percent aqueous solution of hydrogen peroxide to provide a mixture of 1.05% hydrogen peroxide (active) based on the weight of polyethylene. The resulting mixture was fed to an extruder and heated from room temperature to a temperature of 780° F. in 30 seconds. The mixture was cooled down to about 450° F. before leaving the extruder. The reformed polyethylene had a molecular weight of about 5000, a viscosity of 70 cps. at 300° F., a melting point of 255° F. and a penetration of 2 at 77° F./100 g./5 sec.

This reformed polyethylene was dissolved in an amount of 15 pounds with 85 pounds of hot mineral spirits (boiling point range of 290 to 310° F.). The resulting mixture was cooled to room temperature and then applied as an automobile wax to an automobile. After 1 to 3 minutes drying in the atmosphere, the applied wax was buffed to produce a hard gloss which was resistant to repeated washings with detergent. Even though the automobile had dirt and/or water on the surface treated with the paste, application of the past transferred the dirt and water to the applicator leaving clean, highly glossy surface. It makes no difference whether a dry of wet applicator is used.

The reformed polyethylene produced by Example 1 in an amount of 5 pounds was mixed with 20 pounds of fully refined paraffin wax (melting point 136 to 138° F.) and the mixture was dissolved in 75 pounds of mineral spirits (boiling point range of 290 to 310° F.). The resultant solution was cooled to form a paste. The paste was applied as an automobile wax to an automobile, was allowed to dry for 1–2 minutes and then was slightly buffed to produce a high gloss which was resistant to repeated washings with detergent. Even though the automobile had dirt and/or water on the surface treated with the paste, application of the paste transferred the dirt and water to the applicator leaving clean, highly glossy surface. It makes no difference whether a dry or wet applicator is used.

EXAMPLE 2

A powdered polyethylene (100 pounds) having a molecular weight of 80,000 and a melt index of 1.0 is wetted with 5.0 pounds of a 35 weight percent aqueous solution of sodium percarbonate. The resulting mixture is heated from room temperature to a temperature of 800° F. in 60 seconds and then cooled to 450° F. The reformed polyethylene has a molecular weight of about 7000, a viscosity of about 70 cps. at 300° F., a melting point of 265° F. and a penetration of about 1 to 2 at 77° F./100 g./5 sec.

This reformed polyethylene was dissolved in an amount of 15 pounds with 85 pounds of hot mineral spirits (boiling point range of 290 to 310° F.). The resulting mixture was cooled to room temperature and then applied as an automobile wax to an automobile. After 1 to 3 minutes drying in the atmosphere, the applied wax was buffed to produce a hard gloss which was resistant to repeated washings with detergent. Even though the automobile had dirt and/or water on the surface treated with the paste, application of the paste transferred the dirt and water to the applicator leaving clean, highly glossy surface. It makes no difference whether a dry or wet applicator is used.

The reformed polyethylene produced by Example 2 in an amount of 5 pounds was mixed with 20 pounds of fully refined paraffin wax (melting point 136 to 138° F.) and the mixture was dissolved in 75 pounds of mineral spirits (boiling point range of 290 to 310° F.). The resultant solution was cooled to form a paste. The paste was applied as an automobile wax to an automobile, was allowed to dry for 1–2 minutes and then was slightly buffed to produce a high gloss which was resistant to repeated washings with detergent. Even though the automobile had dirt and/or water on the surface treated with the paste, application of the paste transferred the dirt and water to the applicator leaving clean, highly glossy surface. It makes no difference whether a dry or wet applicator is used.

EXAMPLE 3

Reformed polyethylene in an amount of 20 pounds, as produced in Example 1, and reduced to powdered form were mixed with 80 pounds of pellets of polyethylene, VYNH made and sold by Union Carbide Corporation, having a molecular weight of 30,000 to 60,000 and a melt index of 1.8 to 2.4. Three pounds of a 35 weight percent aqueous solution of hydrogen peroxide were added to the resulting mixture to wet the same. The resulting mixture was heated from room temperature to 790° F. in 60 seconds. The resulting reformed polyethylene had a molecular weight of about 5,000, a viscosity of 40 cps. at 300° F., a melting point of 245° F. and a penetration of 2 to 3 at 77° F./100 g./5 sec.

This reformed polyethylene was dissolved in an amount of 15 pounds with 85 pounds of hot mineral spirits (boiling point range of 290 to 310° F.). The resulting mixture was cooled to room temperature and then applied as an automobile wax to an automobile. After 1 to 3 minutes drying in the atmosphere, the applied wax was buffed to produce a hard gloss which was resistant to repeated washings with detergent. Even though the automobile had dirt and/or water on the surface treated with the paste, application of the paste transferred the dirt and water to the applicator leaving clean, highly glossy surface. It makes no difference whether a dry or wet applicator is used.

The reformed polyethylene produced by Example 3 in an amount of 5 pounds was mixed with 20 pounds of fully refined paraffin wax (melting point 136 to 138° F.) and the mixture was dissolved in 75 pounds of mineral spirits (boiling point range of 290 to 310° F.). The resultant solution was cooled to form a paste. The paste was applied as an automobile wax to an automobile, was allowed to dry for 1–2 minutes and then was slightly buffed to produce a high gloss which was resistant to repeated washings with detergent. Even though the automobile had dirt and/or water on the surface treated with the paste, application of the paste transferred the dirt and water to the applicator leaving clean, highly glossy surface. It makes no difference whether a dry or wet applicator is used.

What is claimed is:

1. Process of treating polyethylene comprising heating polyethylene in the presence of a peroxygen compound in an amount of at least about 0.35 percent based on the weight of said polyethylene to a temperature of at least about 760° F. in not more than about six minutes.

2. Process as claimed in claim 1 wherein said peroxygen compound is hydrogen peroxide.

3. Process as claimed in claim 2 wherein said polyethylene and hydrogen peroxide are intimately admixed.

4. Process as claimed in claim 2 wherein said hydrogen peroxide is present as an aqueous solution.

5. Process as claimed in claim 2 wherein said temperature lies in the range of 780 to about 800° F.

6. Process as claimed in claim 2 wherein said hydrogen peroxide is present in an amount of about 0.35% to about 3% $H_2O_2$ based on the weight of said polyethylene.

7. Process as claimed in claim 2 wherein the product resulting from said heating step is again heated in the presence of hydrogen peroxide to a temperature of at least about 760° F. in not more than about six minutes.

References Cited

UNITED STATES PATENTS 3,110,708  11/1963  Wisseroth et al.
3,160,621  12/1964  Hagemeyer et al.
3,230,191  1/1966  Roedel.

OTHER REFERENCES

International Encyclopedia of Chemical Science, Van Nostrand, New York, 1964.

MORRIS LIEBMAN, *Primary Examiner.*

H. H. FLETCHER, *Assistant Examiner.*

U.S. Cl. X.R.

260—28.5, 33.6, 83.3, 94.7, 96